US006407818B1

(12) United States Patent
Whitehouse

(10) Patent No.: US 6,407,818 B1
(45) Date of Patent: Jun. 18, 2002

(54) PRODUCT SCANNING SYSTEM AND METHOD

(75) Inventor: John Arthur Whitehouse, deceased, late of Norfolk (GB), by Susan Whitehouse, Executrix

(73) Assignee: AEW International Limited, Norwich (GB)

( * ) Notice: Subject to any disclaimer, the term of this patent is extended or adjusted under 35 U.S.C. 154(b) by 0 days.

(21) Appl. No.: 09/623,531

(22) PCT Filed: Mar. 15, 1999

(86) PCT No.: PCT/GB99/00766

§ 371 (c)(1),
(2), (4) Date: Sep. 5, 2000

(87) PCT Pub. No.: WO99/47885

PCT Pub. Date: Sep. 23, 1999

(30) Foreign Application Priority Data

Mar. 16, 1998 (GB) .............................................. 9805445

(51) Int. Cl.[7] .............................................. G01B 11/04
(52) U.S. Cl. .................................. 356/627; 250/559.21
(58) Field of Search ................................ 356/627, 628, 356/634, 635, 639, 640, 601, 608, 614, 609; 250/559.19, 559.21, 559.24, 559.25, 559.26; 83/73, 75, 79

(56) References Cited

U.S. PATENT DOCUMENTS 3,349,905 A * 10/1967 Crawford
3,774,040 A * 11/1973 Stephanos
4,264,208 A    4/1981 Haberl ........................ 356/376
4,381,152 A * 4/1983 Riech et al. ................. 356/385
4,571,498 A    2/1986 Hagan ......................... 250/560
4,737,031 A * 4/1988 Mahlberg et al. ........... 356/385
5,015,867 A * 5/1991 Siegel et al. ................. 250/560
5,457,537 A * 10/1995 Richter ........................ 356/372
5,636,030 A * 6/1997 Limbach ..................... 356/386

FOREIGN PATENT DOCUMENTS

| GB | 2 147 996 | 5/1985 |
| GB | 2239787 | 7/1991 |
| WO | WO 90/02318 | 3/1990 |

* cited by examiner

Primary Examiner—Hoa Q. Pham
(74) Attorney, Agent, or Firm—Lee, Mann, Smith, McWilliams, Sweeney & Ohlson

(57) ABSTRACT

A system in which a succession of products (12) to (16) traverse a gap between two conveyors (10, 18), comprises a ring (32) carrying an array of one or more equi-spaced laser displacement transducers (36–42) connected to a computer (48). The ring is disposed perpendicular to the direction of product movement, such that each product (e.g. a log of food) passes through its central region, the ring being rotatable in a continuous or oscillatory manner. Signals received by the computer from the transducers are stored and computed to determine the shape and/or size of the product to enable the product to be cut into an optimum number of pieces. A method is described for determining volume and thereby weight using mean density values for the products, of irregularly shaped bulk product, particularly fresh meat.

8 Claims, 2 Drawing Sheets

PRODUCT SCANNING SYSTEM AND METHOD

FIELD OF INVENTION

This invention concerns product scanners, particularly scanners to be used in conjunction with product handling apparatus such as cutting or slicing apparatus and especially such apparatus when employed to cut or slice bulk foodstuffs.

BACKGROUND OF THE INVENTION

In many processes where randomly shaped raw material in bulk form is to be cut into portions, it is desirable to be able to feed to a control system information concerning the geometry and topography of the bulk material before it passes to the cutting step in the process. Such information can enable a control system to calculate where to position the raw material correctly for the cutting operation and to optimise the process to produce the best yield of cut portions from the bulk.

Scanning methods are known whereby product moving along a conveyor is viewed by a TV camera and the information is fed to a computer forming part of a process control system. The accuracy of such systems has not allowed cutting controls signals to allow optimal division of bulk product such as fresh meat, into portions of appropriate size and weight ideal for retailing.

SUMMARY OF THE INVENTION

According to one aspect of the present invention, a system is provided in which product traverses an inspection region at a defined position along a conveyor means and at least one distance measuring transducer is mounted for movement around the region in a plane (the inspection plane) generally perpendicular to the movement of the product therethrough, and the distance from the transducer to each of a succession of points on the product surface in the inspection plane is determined by computer means supplied with signals from the transducer and the values are stored and used in a computation to determine at least the shape and/or size of the cross-section of the product in the inspection plane.

Where the product is relatively rigid such as frozen bulk food, it is generally necessary to inspect the surface of the product through 360°.

Where access to the whole surface is required the inspection plane needs to be at a discontinuity in the conveyor means—typically a gap between two conveyors.

Where full 360° access is not required the conveyor means can if desired extend continuously through the region.

Where the product is not rigid such as fresh meat, the underside of the product will tend to conform to the surface on which it rests. In the case of a conveyor this may be flat or dished to form a trough in line with the conveyor length direction.

Provided the conveyor surface shape is known (and it can be determined if desired by the transducer and computing means without product in the inspection plane) the inspection of the product surface can be restricted to the free surface of the product which if the conveyor is continuous through the inspection station will in any case be fully supported over the whole of its underside which can be assumed to conform to the surface of the conveyor. If (as may be desirable to accommodate cutting blades or saws or simply to render the system able to handle rigid frozen product as well as fresh floppy product) a narrow gap exists in the inspection plane between two conveyors which comprise the conveyor means, one feeding product to the inspection station and the other conveying it away in the same general direction as it is delivered thereto, the underside of the product can still be considered to be the same shape as that of the upper surface of each of the conveyors, thereby obviating the need for the transducer to "inspect" the underside of the product where it bridges the narrow gap.

The time required to scan the cross-section can be reduced by using a plurality of transducers equally spaced around the inspection region so that less than 360° of movement is needed for the transducers in order for the whole of the surface in the said region to be inspected.

Where less than 360° inspection of the surface is required, typically only 180° because the underside surface is assumed to be known, the process can be further speeded up by rotating the single transducer or a plurality of equally spaced apart transducers through just sufficient of an angle for all the surface which needs to be inspected to be seen by the transducer or transducers.

According to a preferred feature of the invention, the transducer or transducers are rotated first in one sense and then back in an opposite sense to the same extent, so that flexible cable connections may be made between the transducer or transducers and a stationary computing means.

The shape and/or size value for the product cross-section may be stored for each of a succession of positions of the product relative to the inspection region, to enable the volume of the product to be determined by a further computational step.

Preferably signals are generated when a length of product enters and leaves the inspection region and to this end proximity or movement sensors may be provided at appropriate positions along the conveyor means, or the inspection transducer or transducers and the computation means may be programmed to produce product arrival and product departure signals.

In one embodiment transducers are located at 90° intervals around the inspection region, for movement in synchronism and the movement may be continuous or oscillatory, so as to inspect the whole of the surface of product.

Thus for example laser displacement transducers may be mounted at 90° intervals around a ring and positioned so that they direct their beams through a gap between two in line conveyors, and the ring may be driven in rotation by a servo motor.

Conveniently the servo motor is controlled by a computer, which conveniently is employed also to perform the computation on the cross-section data gathered from the transducer(s).

Preferably four such transducers are arranged equally spaced around the ring and the output of each of the transducers is logged by the computer means.

Where only a single transducer is employed it is necessary to rotate it around the whole of the arc over which inspection is required, and if full 360° inspection is required, the arc must extend around a full 360° centered on the product.

If the arcuate movement of the transducer or transducers is fast enough in relation to the linear movement of the product, the locus of the inspection point around the surface of the product is a closed path similar to the line which will be produced if a very thin knife were to have sliced through the product leaving the two cut surfaces abutting. If the product happened to be of a circular cross-section, and the product is stationary or the transducer speed of rotation is very fast relative to the linear speed of the product, the locus of the inspection point will be a closed circle.

If the rotation is not fast enough, the locus of the point will describe a continuous path somewhat in the form of a helix, the cross-sectional shape of which will be determined by that of the product log. Only a true helix will occur in the case of product whose cross-section is circular. The "helical" type of path is that which will normally be obtained.

A true cross-section can be obtained if the movement of the product is intermittent, so as to move relative to the transducer(s) in a series of steps, and where the output of the transducer(s) is only used when the product is stationary, or the transducer(s) is/are switched so as only to be active when the product is stationary.

In a preferred embodiment for use with fresh meat bulk product, three transducers are arranged equidistantly around an arc centred on the inspection region so that it is only necessary for the array to rotate through 60° for the entire upper surface of the bulk product to be traversed by the three transducer inspection spots, thereby reducing the advance of the "helix" per scan, and allowing either a greater linear speed of the product through the inspection plane or a higher sampling rate of the bulk product cross-section and therefore a more accurate description of each product cross-section to be obtained. By oscillating the array back and forth through 60° and scanning during both forward and reverse movements of the transducer array the whole of the upper surface of the product can be scanned by the transducer light spots as it passes through the inspection plane.

An arc containing three transducers typically extends around 120° C.

If six transducers were mounted equidistant around a 150° arc, the sampling rate, or the linear product speed, can be doubled, since it is only necessary to rotate the array through 30° for all the circumference which is to be inspected, to be seen.

Where it is desirable that the transducer or transducers is/are to rotate continuously, slip ring connections may be employed, or one or more low power radio transmitter devices may be associated with the transducer array for transmitting transducer output signals as a modulation of a radio signal to a nearby stationary receiver, from which they are conveyed to a computer means.

Where one transmitter is mounted on an array of two or more transducers, the output of each transducer may be transmitted on a different channel, or time division multiplexing, or any other multiple channel technique may be employed, to transmit the two or more transducer output signals to one or more radio receivers adapted to decode the received signal or signals to allow the distance data to be derived from the received radio signals for input to the computer means.

The conveyor means may also be driven by at least one servo motor which may also be controlled from the computing means in a similar way to the servo motor driving the transducer array, and the or each conveyor servo motor is synchronised to provide reliable transfer of product from one conveyor to the other across any gap. Preferably the computer control also synchronises the transducer scanning servo motor in relation to the conveyor motion.

Sensors may be provided to deliver feedback signals to the computer to indicate actual movement of the conveyor and/or transducer(s), to provide a form of closed loop servo control and to indicate to the computer when product is about to enter or leave the inspection plane or any interruption in either movement occurs.

According to another aspect of the invention there is provided a method of determining the volume of a length of bulk product having a varying cross-section, comprising the steps of linearly moving the product through an inspection plane which extends generally perpendicular to the linear movement of the product by motor-driven conveyor means, moving a distance measuring transducer along an arcuate path in the inspection plane, computing the length of the product by reference to its linear speed past at least one detector which may be the transducer or transducers, and computing the distance from the transducer to each of a succession of points around the product surface in the inspection plane, and computing therefrom the area of the cross-section defined by the said points, and where these do not extend completely around the product cross-section, employing stored data about the shape of the surface supporting the bulk product in, or just upstream or downstream of the inspection plane, to provide a complete set of data by which to compute the cross-sectional shape and/or area, determining the increments of volume of bulk product attributable to each transducer scan by reference to the distance moved by the product before the next scan, and summarising the increments of volume over the whole of the length of the bulk product as it progresses through the inspection plane.

The method also comprises the steps of scanning the conveyor support surface in the inspection plane and storing data relating thereto, when product is absent.

The weight of the bulk product can be computed by employing a mean density value and multiplying volume by mean density, and an example of such a process to which the invention can be applied is one in which a log of fresh meat is to be fed into a cutting machine in which the position and/or angle of each cut determines the size and/or weight and/or volume and/or shape of the severed portions. Using the invention portions of constant weight or constant volume or a particular shape can be cut from any particular lump of meat, and/or the volume/shape/weight may be adjusted so as to produce the optimum number of steaks and end pieces from the bulk.

Other applications lie in the field of grading product, where product is sorted weight, volume, length etc.

BRIEF DESCRIPTION OF THE DRAWINGS

The invention will now be described by way of example with reference to the accompanying drawing, in which.

DETAILED DESCRIPTION OF THE DRAWINGS

Figures 1, 2:
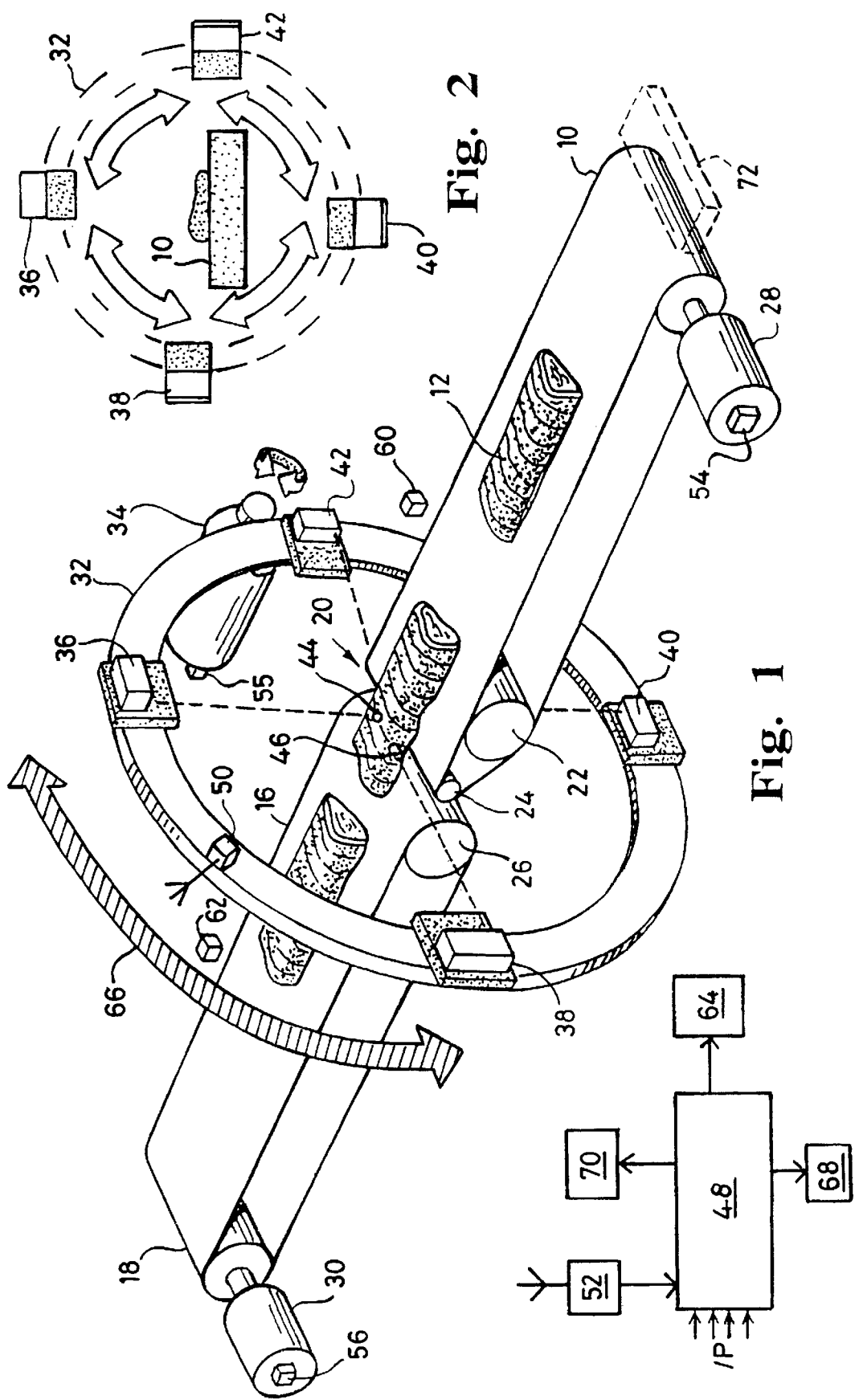
FIG. 1 illustrates diagrammatically apparatus comprising a scanning system embodying the invention for inspecting the cross-section of logs of foodstuff such as meat or fish.
FIG. 2 is a end view of the apparatus of FIG. 1.

In the drawings a conveyor 10 supplies logs of product such as 12, 14, 16 to a second main conveyor 18, and in doing so causes each log to traverse a small gap 20 between the end of conveyor 10 and the beginning of conveyor 18.

The exit from conveyor 10 is defined more precisely than would be the case if end roller 22 alone served this purpose, by virtue of a jockey roller 24 of smaller diameter, positioned so as to extend the horizontal surface of the infeed conveyor 10 further towards roller 26 of the outfeed conveyor 18 than would otherwise be the case.

A similar jockey roller (not shown) may be employed in a similar fashion at the entry end of the outfeed conveyor 18, if desired.

Servo motors 28 and 30 drive conveyors 10 and 18 respectively.

Around the gap 20 is located a circular ring 32 which is rotatable either continuously or in an oscillatory manner by a servo motor 34. The plane of the ring 32 is generally perpendicular to the line of direction of movement of the conveyors, and the horizontal surface of the conveyor extends through the central region of the ring so that product carried thereon is also located at the centre of the ring.

Mounted at equally spaced apart points around the ring 32 are four distance measuring transducers 36, 38, 40 and 42 respectively, each being directed radially inwards so as view an elemental region of the surface of any product bridging the gap 20. As shown, the product "log" 14 bridges the gap, and the elemental areas of the surface seen by transducers 36 and 38 are shown at 44 and 46 respectively.

Although the transducers 36 to 42 are capable of accurately measuring distance over a significant range, where the apparatus is to handle product of significantly differing cross-sectional size, provision may be made for adjusting the position of the ring 32 relative to the two conveyors 10, 18 so as to accommodate larger cross-sectional product within the central area of the ring, and where desirable to position the centre of the cross-section of the product log as near as possible to the centre of the ring.

By way of example, the transducers 36 to 42 may be laser displacement transducers of the type manufactured and supplied by Keyence Corporation of the USA, such as those forming the LB-1000 Series, and in particular types LB-301 and LB-1201 which are capable of measuring distances in the range 200–400 mm. Reference is made to the Keyence LB-1000 Series Instruction Manual for operational and connection details for such devices.

A system control and log measuring computer 48 receives distance signals from the transducers 36 to 42 as first inputs, possibly via a radio link such as formed by transmitter 50 and receiver 52, and also information as input signals from transducers 54, 56 and 58 on the motors 28, 30 and 34 respectively, and optionally from proximity sensors or the like at 60 and 62, to indicate the arrival and departure of logs such as 14 into and out of the plane of the ring 32.

The computer 48 also provides output signals to a motor controller 64 which in turn controls the supply of electric current to each of the motors 28, 30 and 34.

The motor 34 may be controlled by the computer so as to rotate first in one sense and then the other so as to oscillate the ring 32 through a 90° arc as shown by the double ended arrow 66.

It is to be understood that if only two transducers are mounted at 180° apart around the ring then the oscillatory motion would have to be 180°, and if only one transducer is mounted around the ring, the oscillatory motion would have to be a full 360°.

It is to be noted that the number of transducers will determine the length of arc of the oscillatory motion, and the greater the number of transducers the smaller will need to be this arc.

The computer also provides a data output to a printer or other output device 68 to allow a record to be kept of the computed areas and/or volumes of the logs in the same order as they move one after another through the gap 20.

The computer also provides data output to a process control system which provides control signals for a cutting machine such as a guillotine or bandsaw (not shown) which is supplied with logs of product 16, 14, 12 in turn from the output of the conveyor 18.

A weighing scale may be incorporated into the apparatus such as that shown at 72 at the infeed end of the apparatus. It is to be understood that if a weighing scale is incorporated it can be incorporated at any convenient point and does not necessarily have to be incorporated in the infeed end.

FIG. 2 merely shows the apparatus of FIG. 1 from the infeed end and shows the preferred oscillatory motion of the ring 32.

In operation, as a log of food product travels along the conveyor, it passes through the laser beams as it traverses the gap between the conveyors. The scan servo motor 34 causes the laser transducer supporting ring 32 to oscillate through 90°.

The output of each of the four laser transducers 36, 38, 40 and 42 varies proportionally with its distance from the point from which its beam is reflected from the surface of the log, such as 44 or 46.

By measuring and recording the output of each of the transducers 36 to 42, and logging that data relative to the known angular position of the laser assembly (derived from the transducer 58 of scan drive servo 34 and the known linear position of the product derived from the transducer 54 of infeed servo 28, for example), so a full three-dimensional map of each product log such as 14 can be built up in a memory within the computer 48.

Scan patterns are infinitely variable from straight line (in which the scan servo 34 is stationary) to circular (where the conveyor servos 28, 30 are stationary) with a helical type of scan of variable angle depending on the relationship between the rotational speeds of the various motors lying between these two extremes.

Other information may be added to the data to be stored in the process control computer 48, such as the length and/or weight of each log and/or the total weight of N logs of food product derived from weighing cell 72, enabling the computer to determine parameters to be applied to subsequent process steps.

Figure 3A:
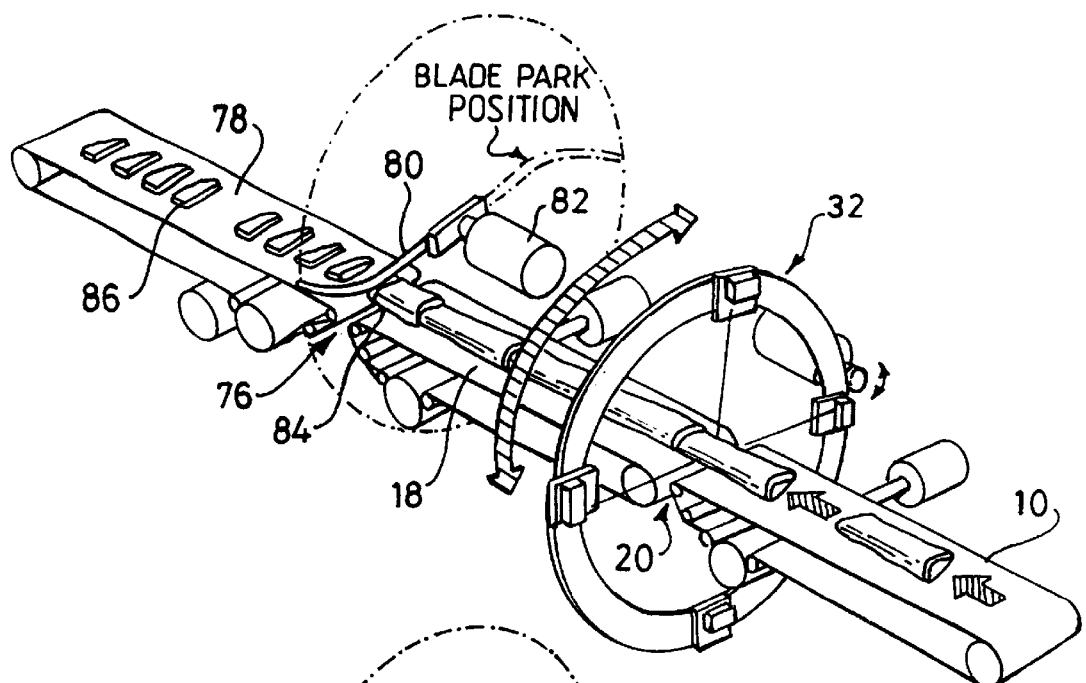
FIG. 3 in a modification of the apparatus of FIG. 1.

The lengths of the logs may be obtained by inspecting the output signals of one or more of the laser transducers or from signals from sensors such as 60 and 62, or where it is known that no slip occurs, from the rotation of the conveyor drives 28 and 30. Referring now to FIG. 3, there is shown a modification of the apparatus of FIG. 1 in which similar parts are indicated by the same reference numerals.

Spaced by a narrow gap 76 from the main conveyor 18 is a third outfeed conveyor 78. A long guillotine blade 80 driven by a motor 82 is positioned to pass through the gap so as to slice the product, in this case a log of meat 84, into individual slices or portions 86. Since the speed of the conveyor 78 is higher than that of the main conveyor 18, the portions are separated from one another as they drop onto the conveyor 78.

In this arrangement the length of a log traversing the gap 20 between conveyors 10 and 18 is calculated by the computer 48 from a signal from the motors 28 and 30 (which normally drive the conveyors at the same speed), indicating the actual speed of the conveyors, and from signals from the transducers 36 to 42 indicating the entry and exit of the log in passing across the gap 20. By thus computing the volume of the log, and having input into its memory store a constant figure for the average density of the product, so the weight of the log can be determined.

The computer 48 is also connected to the motor 82 to control the operation of the blade 80. A variety of programs can be input to the computer to achieve optimum sliced portions of product, eg of the constant thickness or weight. For example, the program can automatically alter the slice thickness due to variation in the profile or cross-section of the log, as determined by the transducers, so as to obtain constant weight portions.

Figure 3B:
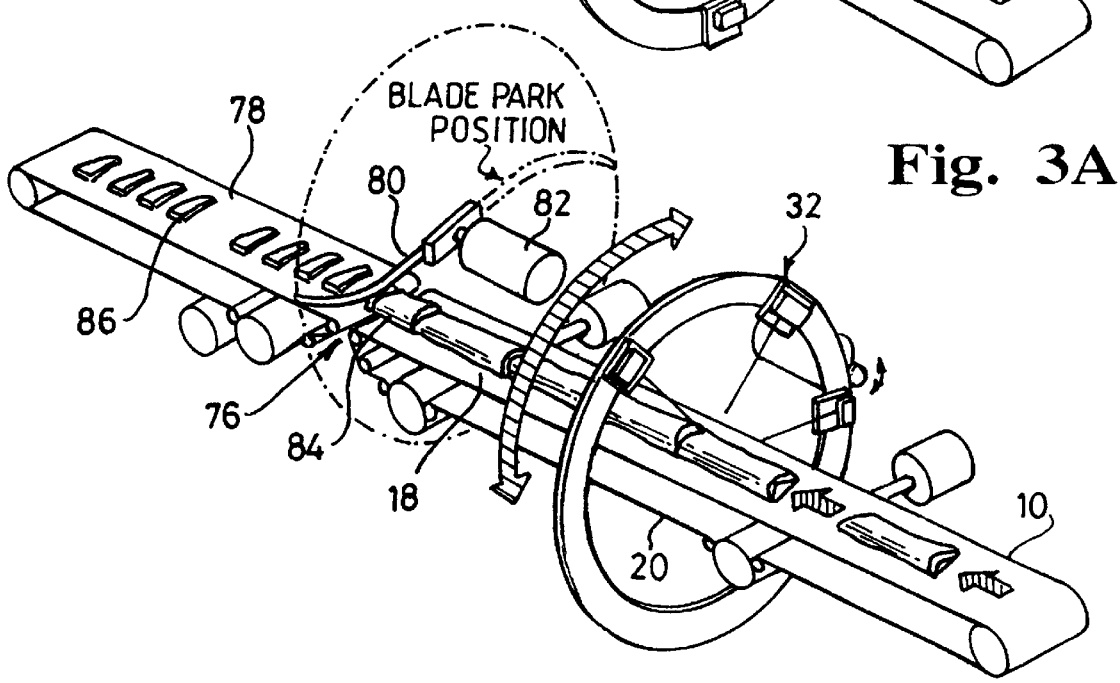

The transducers also serve to indicate the actual position of a log on the conveyors 10 and 18 so that, in the absence of slip, the precise position of the log can be determined by the computer 48 when it reaches the blade 80. The gap 20 shown in FIG. 3A between the conveyors 10 and 18 and the provision of a 360° rotatable scaning array, allows the transducer to "see" all round the bulks of product. In the alternative arrangement of FIG. 3B, in which the conveyor extends continuously through the inspection region transducers are now only required above the conveyor as shown in FIG. 3B.

What is claimed is:

1. A method of determining the volume of a length of floppy bulk product having a varying cross-section, comprising the steps of:
   (1) placing the product on a supporting surface provided by a motor-driven conveyor,
   (2) linearly moving the product through an inspection plane which extends generally perpendicular to the linear movement of the product by the motor-driven conveyor,
   (3) moving at least one distance measuring transducer in the inspection plane along an arcuate scanning path which extends in the inspection plane only around a part of the product cross-section which included an unsupported surface region of the product,
   (4) computing the length of the product by reference to its linear speed or position past a detector,
   (5) computing distance from the transducer to each of a succession of points around the unsupported surface region of the product in the inspection plane,
   (6) storing data as to shape of the supported surface region of the product,
   (7) computing from said distances and said data the area of the cross-section of the bulk product in the inspection plane,
   (8) determining the increments of volume of bulk product attributable to a succession of transducer scans by reference to the distances moved by the product between successive scans, and
   (9) summing the increments of volume over the whole of the length of the bulk product as it progresses through the inspection plane.

2. A method as claimed in claim 1, when modified to determine the weight of bulk product by the steps of providing a mean density value and multiplying the computed volume by the mean density value.

3. A method as claimed in claim 2, when applied to a log of fresh meat which is to be fed into cutting machine, in which at least one of the position and angle of each cut determines at least one of the size and weight and volume and angle shape of the severed portions, and wherein computer means determines the positions at which the log is to be cut from the data derived from the transducer to enable a portion of one of constant weight, constant volume, and a particular shape to be cut from the log of meat, and adjusting one of the volume, shape and weight to produce the optimum number of steaks and end pieces from the log of meat.

4. A method as claimed in claim 3, wherein the computer determines the positions at which the log is to be cut so as to produce an optimum number of steaks and end cuts from the log of meat, with reference to a preferred volume or shape or weight or combination thereof.

5. A method as claimed in claim 1, wherein the conveyor extends through the inspection plane and the shape of the underside surface of product which is to be conveyed therethrough by the conveyor is determined by scanning the surface of the conveyor by the transducer at a time when there is no product in the inspection plane, and storing data relating to the shape and position of the upper surface of the conveyor where it extends through the inspection plane to be used subsequently as data defining the underside of product located thereon in the plane.

6. Apparatus for determining the volume of a length of floppy bulk product having a varying cross-section comprising:
   (1) a product-supporting surface provided by a motor-driven conveyor,
   (2) means for driving the conveyor linearly to move the product through an inspection plane which extends generally perpendicular to the linear movement of the product by the motor-driven conveyor,
   (3) means for moving at least one distance measuring transducer in the inspection plane along an arcuate scanning path which extends in the inspection plane only around a part of the product cross-section which included an unsupported surface region of the product,
   (4) a detector,
   (5) means for computing the length of the product by reference to its linear speed or position past the detector,
   (6) means for computing the distance from the transducer to each of a succession of points around the unsupported surface region of the product in the inspection plane,
   (7) means for storing data as to shape of the supporting surface,
   (8) means computing from said distances and said data the area of the cross-section of the bulk product in the inspection plane,
   (9) means for determining the increments of volume of bulk product attributable to a succession of transducer scans by reference to the distances moved by the product between successive scans, and
   (10) means for summing the increments of volume over the whole of the length of the bulk product as it progresses through the inspection plane.

7. A system as claimed in claim 6 comprising an array of three transducers arranged equidistantly around said path, and means to rotate the array through 60° to inspect the entire upper surface of the product thereby enabling inspection at one of a higher sampling rate and a greater linear product speed.

8. A system as claimed in claim 6 in which the said at least one distance measuring transducer comprises a laser displacement transducer.

\* \* \* \* \*